Sept. 1, 1931.     W. P. MELCHER     1,821,718
CUTTING IMPLEMENT
Filed Oct. 21, 1929
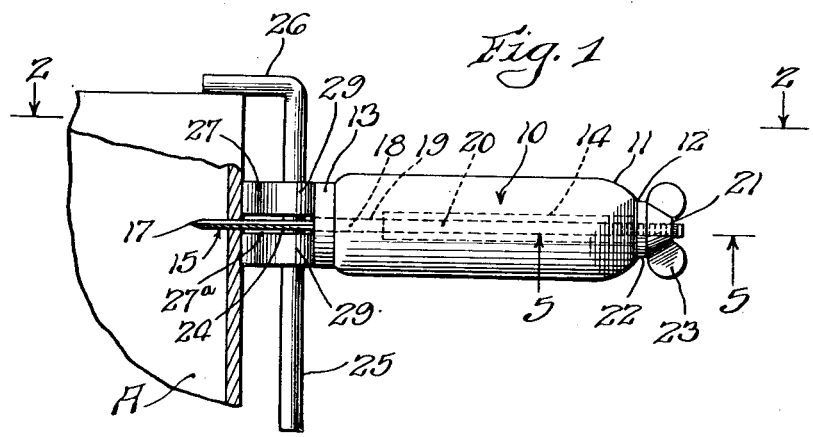
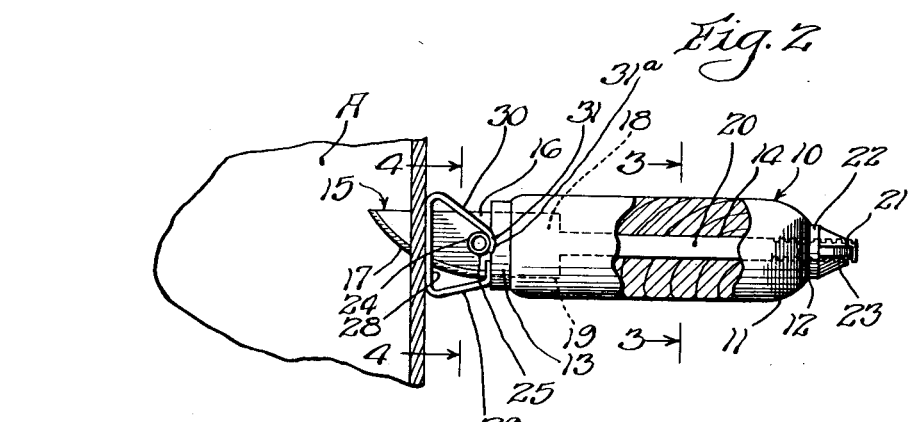
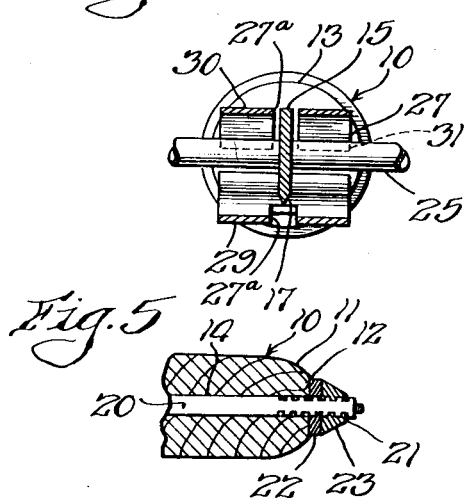
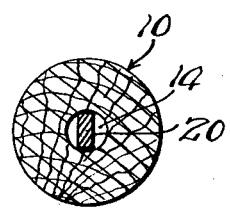
Walter P. Melcher INVENTOR
BY Victor J. Evans
HIS ATTORNEY.

Patented Sept. 1, 1931

1,821,718

UNITED STATES PATENT OFFICE

WALTER P. MELCHER, OF CHICAGO, ILLINOIS

CUTTING IMPLEMENT

Application filed October 21, 1929. Serial No. 401,188.

This invention relates to certain novel improvements in cutting implements and has for its principal object the provision of an improved arrangement of this character which will be highly efficient in use and economical in manufacture.

The salient object of my invention is to provide a cutting implement which will embody a cutting member and means limiting the amount the cutting member may penetrate into the article to be cut, which means will also serve to guide the cutting member during the cutting action.

Another object of the invention is to provide in association with the above described mechanisms a member which may be used as a locating device to position the cutting member at a predetermined place on the article to be cut.

A further object of the invention is to provide an arrangement that will serve to effectively retain the cutting member in position.

A still further object of the invention is to so arrange the member which is employed to guide the cutting member that it will be retained in position by the members employed to retain the cutting member in position.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is an elevational view depicting a preferred form of construction for my invention in operative position;

Fig. 2 is a view taken substantially on the line 2—2 on Fig. 1;

Fig. 3 is a transverse sectional view taken substantially on the line 3—3 on Fig. 2;

Fig. 4 is a sectional view taken substantially on the line 4—4 on Fig. 2; and

Fig. 5 is a sectional view taken substantially on the line 5—5 on Fig. 1.

In the accompanying drawings wherein I have illustrated a preferred form of construction for my invention 10 generically indicates the handle of my device which is preferably substantially cylindrical in form and which includes at one end thereof a rounded portion 11 that terminates in a flattened portion 12. The other end of the handle 10 is reduced to provide a collar about which a ferrule 13 is fitted. Extending through the handle 10 is an axial opening 14.

The cutting member of my improved device is generically indicated by 15 and includes an enlarged head 16 which embodies a straight edge and opposite this straight edge there is provided a rounded edge 17 which merges into the edge 16 and this edge 17 is preferably arranged to provide a knife edge. The inner relatively wide end of the cutting member 15 is indicated by 18 and is preferably substantially rectangular in form. At the end of the handle 10 having the ferrule 13 associated therewith I provide an inwardly extending substantially rectangular opening 19 and a substantially rectangular end portion 18 of the cutting member 15 is intended to be fitted into this opening 19.

The cutting member 15 includes a tang portion 20 which extends from the outer end of the rectangular portion 18. This tang 20 is directed through the opening 14 and the outer end of the tang portion 20 is screw threaded as indicated at 21. A washer 22 is provided which fits against the flattened surface 12 and which is disposed around the screw threaded end portion 21 of the tang 20. A wing nut 23 or other analogous securing device is threaded onto the screw threaded end portion 21 and engages the washer 22.

In the head portion of the cutting member 15 providing the knife edge 17 I provide an opening 24. Extended through this opening 24 is a rod like member 25 which is substantially L-shaped in formation to provide a foot portion 26. The substantially L-shaped member 25 provides the locating member and is utilized in the manner to be set forth presently.

The member for guiding the cutting member 15, which also serves to limit the pentration thereof, is generically indicated by 27. This member 27 comprises a relatively flat portion 28 that is arranged to extend parallel to the end of the handle 10. The member 27 also includes a leg portion 29 and leg portions 30. At the free end of the leg portions 30 substantially hook shaped portions 31 are provided. After the member 25 has been passed through the opening 24 the member 27 is disposed with the cutting member 15 extended through the slot 27a therein and the leg portion 29 thereof in abutment with the forward end of the handle 10. The hook portions 31 are disposed behind the rod like member 25 and fit into grooves 31a in the end of the handle. The wing nut 23 is then manipulated to act on the screw threaded end portion 21 so that it will tend to move this screw threaded end portion 21 outwardly through the handle 10. This will manifestly move the rod like member 25 toward the end of the handle 10 and it is, therefore, obvious that a clamping action will result which will be controlled by the wing nut 23 and which will securely lock the cutting member 15, the rod like member 25, and the member 27 in position.

In use it is determined at what position it is desired to cause the cutting member 15 to enter the article indicated by A. This article may be a paper-board box known as a carton or any other analogous member. The end portion of the member 25 embodying the foot portion 26 is extended from the structure, hereintofore described, an amount so that when the foot portion 26 is rested against the surface of the article A extending at right-angles to the surface in which the cut is to be made the cut will be made at the desired location. The cutting implement 15 is extended into the article until the portions 28 of the means 27 engage the surface in which the cut is to be made. By reason of the relatively great width of these portions 28 it is manifest that the cutting implement 15 will be properly guided as it is moved over the surface in which the cut is to be made. It is manifest that the foot portion 26 may be extended in any desired amount and, therefore, the cut may be made at any desired location. By reason of the fact that the cutting implement is very effectively guided it is apparent that a neat and proper cut may be made in the article to facilitate opening thereof.

While I have illustrated and described the preferred form of construction for carrying my invention into effect, this is capable of variation and modification, without departing from the spirit of the invention. I therefore, do not wish to be limited to the precise details of construction set forth, but desire to avail myself of such variations and modifications as come within the scope of the appended claims.

Having thus described my invention what I claim as new and desire to protect by Letters Patent is:

1. A carton opener comprising, a handle having an axial opening extending therethrough, a cutting member having a tang portion extending through said axial opening, guiding means having portions disposed on each side of said cutting member at one end of said handle, said cutting means having an opening therein, locating means extending through said opening, and means arranged at the outer end of said handle and said tang portion for securing said cutting means, guiding means, and locating means to said handle.

2. In a device of the character stated, a handle having an axial opening extending therethrough and having an enlarged substantially rectangular portion, a cutting member including a tang portion, said tang portion being extended through said opening and said rectangular portion being disposed in said rectangular opening, guiding means having portions disposed on each side of said cutting member at one end of said handle, said cutting member having an opening therein, locating means extending through said opening, and means for securing said cutting member, said guiding means, and said locating means to said handle.

3. In a device of the character stated, a handle having an axial opening extending therethrough and having an enlarged substantially rectangular portion, a cutting member including a tang portion said tang portion being extended through said opening and said rectangular portion being disposed in said rectangular opening, guiding means having an opening therein through which said cutting member may be extended and including leg portions engaging the end of said handle and including substantially flat portions arranged parallel to the end of said handle in spaced relation therewith, said cutting member having an opening therein, locating means extending through said opening, said leg portion of said guiding means including portions disposed between the end of said handle and said locating means, and means at the outer end of said tang portion and said handle for clamping said cutting means, guiding means, and locating means in position at the other end of said handle.

4. A cutting implement comprising a handle having an axial opening extending therethrough, a cutting member including a tang portion extended through said opening and exteriorly threaded at the end opposite said cutting member, said cutting member having an opening therein, a substantially L-shaped locating member extended through said last named opening, a guiding member including a jaw disposed at each side of said cutting member, said guiding member including arms abutting the front end of said handle and including other arms partially encircling said locating member, and means on said threaded portion of said tang for exerting pressure to bind said cutting member, said locating member, and said guiding member in fixed relation to each other.

5. A device of the class described, comprising a handle having an axial opening therein, a cutting member including a tang portion extended through said opening, a locating member carried by said cutting member and adjustable transversely thereof, guiding means including jaws mounted on said locating member and between which said cutting member is extended and said jaws including yieldable portions abutting said handle, and means on said tang portion for forcing said handle into engagement with said yieldable portions to fix said members and said guiding means in operative relation to each other.

6. A device of the class described, comprising a handle having an axial opening therein, a cutting member including a tang portion extended through said opening, a locating member carried by said cutting member and adjustable transversely thereof, guiding means including jaws mounted on said locating member and between which said cutting member is extended and said jaws including yieldable portions abutting said handle, and means on said tang portion for forcing said handle into engagement with said yieldable portions to fix said members and said guiding means in operative relation to each other pivotally.

In testimony whereof I affix my signature,

WALTER P. MELCHER.